May 29, 1923.

D. C. DAVIS 1,457,214

MACHINE FOR TESTING HARDNESS OF MATERIALS

Filed April 26, 1919  3 Sheets-Sheet 1

Inventor
Donald C. Davis,
by Wilhelm & Parker
Attorneys

May 29, 1923.  1,457,214
D. C. DAVIS
MACHINE FOR TESTING HARDNESS OF MATERIALS
Filed April 26, 1919   3 Sheets-Sheet 2

Inventor
Donald C. Davis
by Wilhelm & Parker
Attorneys

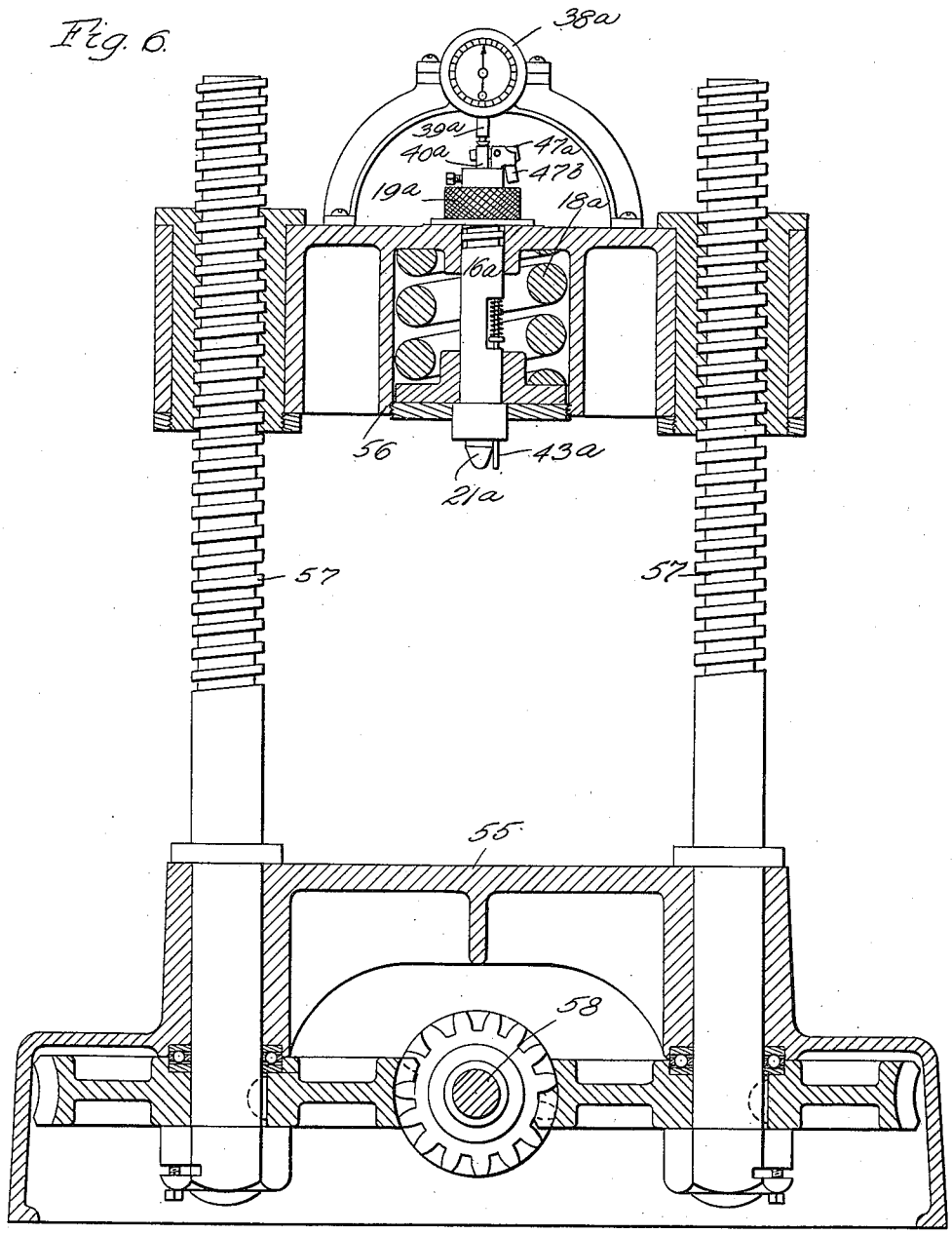

Patented May 29, 1923.

1,457,214

UNITED STATES PATENT OFFICE.

DONALD C. DAVIS, OF BUFFALO, NEW YORK.

MACHINE FOR TESTING HARDNESS OF MATERIALS.

Application filed April 26, 1919. Serial No. 292,815.

*To all whom it may concern:*

Be it known that I, DONALD C. DAVIS, a citizen of the United States, residing at Buffalo, in the county of Erie and State of New York, have invented a new and useful Improvement in Machines for Testing Hardness of Materials, of which the following is a specification.

This invention relates to machines for testing the hardness of materials by the so-called "Brindell" method in which a hardened steel ball is pressed against the sample or piece of material being tested, the hardness of which is determined from the measurement of the indentation made by the ball in the sample under a predetermined pressure.

The objects of the invention are to provide a hardness testing machine which will ensure accuracy and can be operated rapidly, and which is of lighter and less expensive construction than testing machines of this type as heretofore made; also to construct the machine so that it can be readily adapted and adjusted for testing samples of different sizes and shapes and of different degrees of hardness; also to provide the machine with reliable indicating means whereby the depth of the indentation and the travel of the testing member can be quickly and accurately ascertained; also to make the measuring element entirely separate and independent of the pressure producing or power element so that the measuring element can be readily removed as a unit and replaced in the machine without affecting its adjustment, capacity or accuracy, and so that one measuring element suited for one class of work can be readily substituted for another measuring element suitable for a different class of work; also to construct the machine so that any wear which may occur in the power element will have no effect on the results indicated by the measuring element; also to improve testing machines of this type in the other respects hereinafter described and set forth in the claims.

In the accompanying drawings:

Fig. 6 is a sectional elvation of a machine showing another embodiment of the invention.

Figure 1:
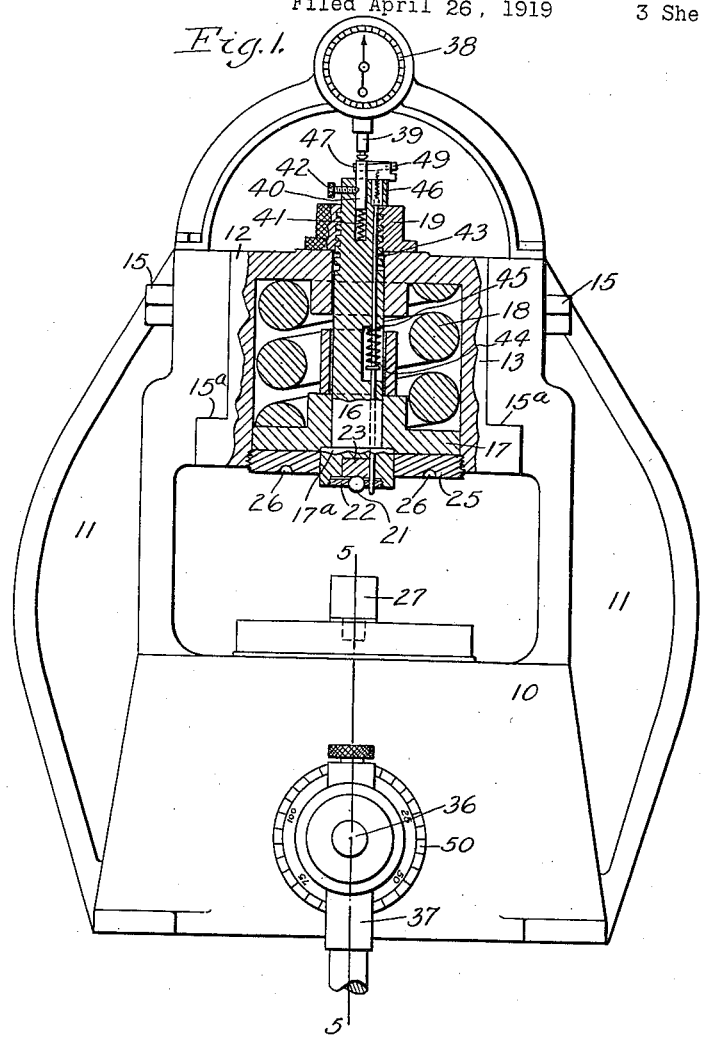
Fig. 1 is a sectional elevation of a testing machine showing one embodiment of the invention.

The machine comprises a suitable stationary frame, a measuring element mounted on this frame and embodying a movable plunger or part carrying the testing ball or member, and a spring acting on the plunger to press the ball yieldingly against the sample, a platen or support for the sample arranged opposite the measuring element, suitable mechanism for effecting a relative movement between the platen and the testing member to press the sample against the testing member, and measurement indicating means. When the plunger is moved by the pressure of the sample against the ball or member the spring opposes the movement of the plunger and ball and a predetermined movement of the plunger will cause a compression of the spring sufficient to give the pressure required for the test.

The machine as shown in Figs. 1 to 5 of the drawings is constructed as follows:—

The stationary frame of the machine comprises a base portion 10 on which the platen or sample support and the operating mechanism therefor are mounted, and arms 11 which project upwardly from the base portion and on which the measuring element is mounted. This frame may be of any other suitable form and construction having the necessary strength and rigidity. Stationarily, but preferably removably mounted on the arms 11 over or opposite the base 10 is a casing or cylinder 12 which contains the parts of the measuring mechanism. The casing 12 shown is provided at opposite sides with lugs or parts 13 which enter correspondingly shaped grooves 14 in the arms 11, and is rigidly secured therein by bolts 15. 15ª indicate stop shoulders to relieve the bolts 15 from pressure. By removing these bolts the casing 12 with the parts of the measuring element carried thereby can be removed as a unit and replaced. This enables the measuring element to be removed and put in a safe when the machine is not in use to prevent its being tampered with or its adjustment disturbed, and also makes it possible to readily substitute for one measuring element another one of a different capacity without disturbing or in any wise affecting the operating parts of the measuring element.

16 represents a plunger arranged to move centrally lengthwise in the casing 12. Secured to the plunger 16 within the casing 12 is a plate 17 between which and the upper end of the casing is arranged a strong spring 18 which is adapted to be compressed by the upward movement of the plunger. As shown, the plate 17 rests on a shoulder 17ª at the lower portion of the plunger. The upper end of the plunger 16 preferably projects out through a central hole in the head of the casing 12 and is screwthreaded for the reception of an adjusting nut 19 which is adapted to bear against the head of the casing 12 or an interposed washer. By adjusting this nut, the spring 18 can be either placed under a predetermined initial compression or not, as desired. The pressure for which the machine is set can be indicated by an index mark on the nut cooperating with pressure indications 20 on the head of the casing or other suitable part.

21 indicates the testing member, which may be a hardened ball or part of other suitable form. The ball shown is secured at the lower end of the plunger 16 by a retaining plate 22 which is screwed into a threaded recess in the lower end of the plunger 16 and is provided with an opening in which the ball is confined and through which the ball projects for engagement with the sample to be tested. The ball bears at its inner or upper side against a hardened disk 23 arranged between the ball and the end of the recess in the plunger and is provided at its underside with a seat for the ball. This seat can be formed by pressing the ball into the disk before hardening the latter, so that the ball will accurately fit the seat. This construction enables the ball to be readily secured on the plunger and replaced in case of injury to the ball.

25 represents a bottom or a stop plate which is secured to the lower end of the casing 12. This stop plate 25 is preferably screw-threaded and screwed into the threaded lower end of the casing 12. Holes 26 are shown in the stop plate for the engagement of a suitable tool for screwing the plate into and out of the casing.

27 represents the platen or sample support. This preferably consists of a plate arranged above the base 10 of the frame opposite the measuring element and provided with a screw 28 which works in the screwthreaded hole in a nut or sleeve 29 which is mounted to rotate in the base 10 of the frame. As shown, this screw sleeve 29 is provided at its upper end with a flange 30 which bears against a ball bearing 31 in a cavity in the top of the base 10 of the frame. The platen is provided with one or more depending guide pins 32 which are adapted to slide in guide holes in the top of the base 10 of the frame to prevent the rotation of the platen. The platen is raised and lowered toward and from the measuring element by turning the screw sleeve 29. As shown a bevel gear wheel 33 is keyed to the lower end of the screw sleeve and meshes at diametrically opposite sides thereof with two bevel gears 34 and 35 on a horizontal shaft 36 which is journaled in suitable bearings in the base 10 of the frame and is provided at one end with a handle 37 for turning the shaft. One of the bevel gears 34, 35 is keyed on the shaft 36 while the other is loose thereon and is used to equalize the pressure on the platen. By turning the shaft 36 the platen is raised to force the sample resting on the platen against the testing ball. Any other suitable hand or power-operated mechanism for moving the platen toward and from the measuring element can be employed.

As the upward movement of the testing ball is resisted by the spring 18, a predetermined upward movement of the ball will compress the spring and produce a definite pressure of the ball on the sample. The pressure causes the ball to indent the sample to a greater or less extent, depending upon the hardness thereof. The machine can be operated rapidly and the pressure of the testing ball will always be the same for a given movement of the testing member, and this is not affected by any wear or lost motion in the power element. The machine can be readily set for different pressures or to suit different kinds of materials by suitably adjusting the nut 19 and the plunger can be raised by means of the nut and the spring strained nearly to the pressure required for a test, so that when the sample has been caused to contact with the testing member, only a very slight further movement is necessary to secure the testing pressure. The test can therefore be made rapidly.

The means illustrated for showing the travel of the testing member 21 and the depth of the indentation made by it in the sample are constructed as follows:

38 represents a standard type of dial gage suitably mounted stationarily above the plunger 16 and having a vertically movable operating rod 39, the movement of which turns the pointer of the gage. The lower end of this rod is preferably adjustable to permit of the adjustment of the measuring mechanism for different tests. A pin 40 confined in a hole in the upper end of the plunger 16 and pressed upwardly by a spring 41 is adapted to engage and move the gage rod 39. The spring 41 is strong enough to move the rod 39 and turn the gage pointer when the plunger 16 is moved upwardly. 42 is an adjusting screw by which the pin 40 can be adjusted against the action of the spring 41 for the purpose hereinafter explained. It is obvious that other forms of indicators or recorders may be used if desired for showing the travel of the testing member and the depth of the indentation. 43 is a measuring rod which extends through a longitudinal guide hole in the plunger 16 with its lower end adapted to engage the top face of the sample being tested. This rod is pressed downwardly against the sample, as by a spring 44 surrounding the rod between a collar or part thereon and a shoulder 45 on the plunger 16. The rod 43 is provided with an enlarged head or upper end 46 adapted to rest on the top of the plunger and limit the downward movement of the measuring rod. Mounted on the head 46 is a pivoted or movable blade or finger 47 which extends through a slot in the plunger pin 40 and is held up substantially horizontally against the lower end of the gage rod 39 by a spring 48. The upward movement of the finger is limited by the engagement of its inner end with the head 46. 49 is a catch of any suitable kind at the inner end of the finger and adapted to be moved into engagement with the head 46 to hold the outer end of the finger down against the action of the spring 48 out of engagement with the gage rod 39.

Figures 2, 3:
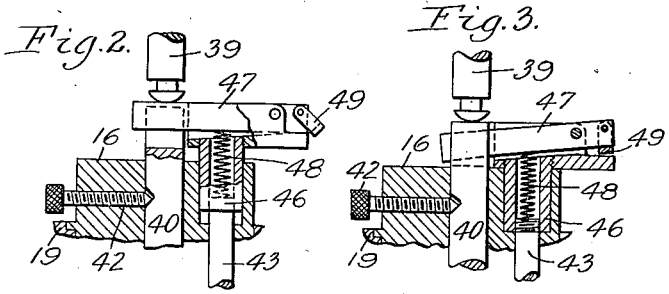
Figs. 2 and 3 are sectional elevations, enlarged, showing two different positions of the indicator operating mechanism.
Figure 4:
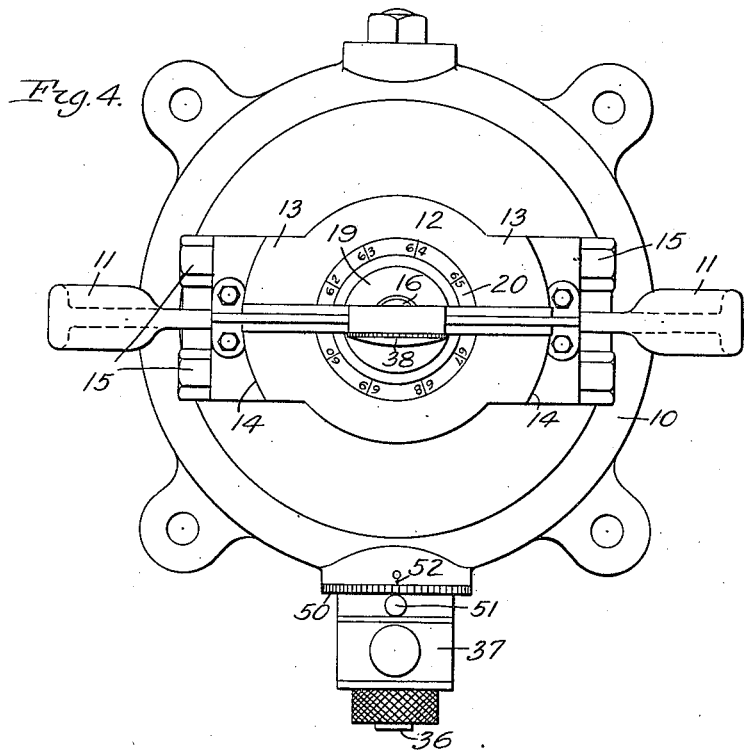
Fig. 4 is a plan view of the machine.
Figure 5:
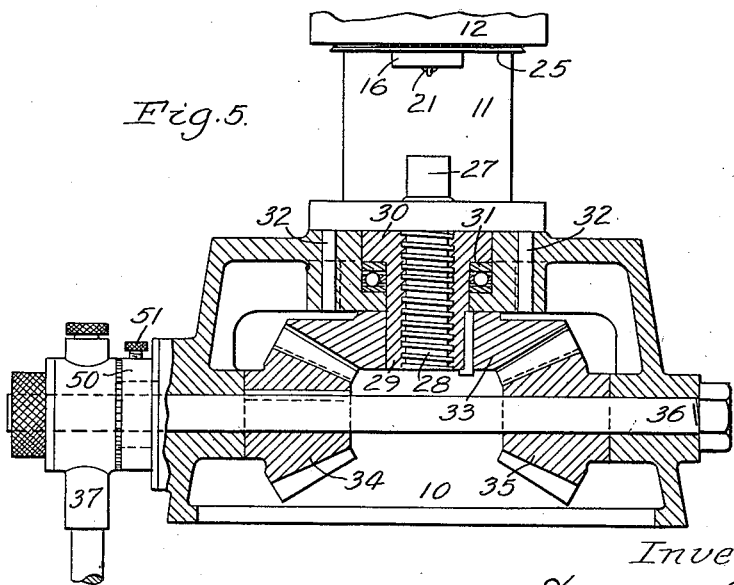
Fig. 5 is a sectional elevation of the lower part of the machine on line 5—5, Fig. 1.

In making a test, the sample is placed on the platen and moved upwardly by turning the handle 37 until the sample contacts firmly with both the testing ball 21 and the lower end of the measuring rod 43. The plunger pin 40 is then adjusted by means of the screw 42 so that with the finger 47 in its raised position the pin 40 and finger 47 will both just contact with the lower end of the gage operating rod 39 when the sample is in contact with the testing member. Then the finger 47 is preferably depressed and the catch 49 moved to hold the finger down as shown in Fig. 3. Then by turning the handle 37, the sample is moved upwardly, forcing the testing plunger 16 upwardly and compressing the spring until the gage pointer indicates the travel of the plunger necessary to give the required pressure on the testing member. The travel of the plunger and the pressure developed are thus shown directly by reading the gage. The testing ball or member 21 is pressed into the sample more or less by the spring pressure, but the measuring rod 43 does not indent the sample and therefore moves upwardly relatively farther than the plunger 16. If then the finger 47 is released and permitted to be moved upwardly by its spring 48, as shown in Fig. 2, the gage rod 39 will be raised and further move the gage pointer. This additional movement of the pointer, which is read by graduations of the gage, shows the depth of the indentation made in the sample by the testing member 21. If the reading is obtained by operating the finger 47 in the manner explained while the plunger is up and the pressure still on, the reading does not allow for the elasticity of the sample. By lowering the sample and plunger to the zero position and thus removing the pressure on the testing member before operating the finger the reading will not be affected by the elasticity of the sample and will show the true depth of the indentation. While the finger 47 is preferably mounted and operated as described, similar results can be secured by a movable device on the measuring rod differently constructed and mounted. The measuring rod 43 can also be differently arranged to move as explained with and relatively to the plunger 16.

50 represents a graduated collar surrounding the hub of the handle 37, of the shaft 36 and adjustably secured thereto by a set screw 51. The collar also can be used to indicate the depth of the indentation in the sample in the following manner. After the handle 37 has been turned and the sample raised until it contacts with the testing member 21, the collar 50 is turned and secured by the set screw with the zero mark on the collar in register with an index mark 52 on an adjacent stationary part of the machine. The handle is then turned to raise the sample and testing plunger until the gage 38 shows the required travel of the plunger, after which the handle is operated to lower the platen and plunger until the latter is in the lowest position. The number of degrees or graduations that the zero mark of the collar 50 is then away from the index mark 52 will indicate the depth of the indentation in the sample, since the sample will be higher to the extent of the depth of the indentation than at the start of the test when the sample was just contacting with the testing member. Thus the depth of the indentation can be read either by means of the collar 50 or the indicating device first described, and one device serves as a check to the other.

In the machine as above described, the measuring device is stationarily mounted and the platen and sample to be tested are moved, but the measuring means are equally adapted to machines in which the sample is placed on a stationary anvil or support and the measuring element is moved to press the testing member against the sample, as shown in Fig. 6.

In the machine shown in Fig. 6 a stationary anvil or support 55 for the sample is formed or provided in any suitable way on the machine base, and the testing member 21ª is carried by a head 56 which is moved toward and from the anvil by screws 57 journaled in the base and having screwthreaded connections with the head 56. The screws are turned for moving the head by a shaft 58 provided with a spiral gear meshing with spiral gears on the two screws. The head can be mounted and moved in any other suitable way.

The measuring mechanism is constructed and operates substantially as above described. $16^a$ indicates the plunger carrying the testing member, $18^a$ the spring for resisting its movement and $19^a$ the arjusting nut. $38^a$ is the gage, $39^a$ its operating rod and $40^a$ the spring pressed pin in the upper end of the testing plunger for actuating the gage. $43^a$ indicates the measuring rod and $47^a$ the pivoted finger piece on the upper end thereof adapted to move the gage operating rod to show the depth of the depression. As here shown this finger piece is adapted to be elevated by the pressure of the operator's finger against a depending portion $47^b$ of the finger piece instead of by means of a spring, as before described. In making a test the indicating means are manipulated in the manner before explained to measure the depression in the sample.

I claim as my invention:

1. In a hardness testing machine, the combination of a movable testing member, means for yieldingly resisting movement thereof, means for causing a sample to press against said testing member and move the same against said resistance, a gage which is actuated by said testing member and indicates the travel thereof, a measuring member which moves relatively to the testing member when the latter is moved, and a device which is moved by said measuring member and which is additionally movable relatively thereto to further actuate the gage to indicate the depth of the indentation made in the sample by the testing member.

2. In a hardness testing machine, the combination of a movable testing member, means for yieldingly resisting movement thereof, means for causing a sample to press against said testing member and move the same against said resistance, a gage actuated by said testing member, a measuring member which is moved by the sample relatively to the testing member, and a device which is moved by said measuring member and which is additionally movable relatively thereto to actuate the gage to indicate the depth of the indentation made in the sample by the testing member.

3. In a hardness testing machine, the combination of a movable testing member, means for yieldingly resisting movement thereof, means for causing a sample to press against said testing member and move the same against said resistance, a gage actuated by said testing member, a measuring member which engages the sample and is moved thereby relatively to the testing member, and a device which is carried by said measuring member and is adapted to be moved relatively thereto for actuating the gage to indicate the depth of the indentation made in the sample by the testing member.

4. In a hardness testing machine, the combination of a movable testing member, means for yieldingly resisting movement thereof, means for causing a sample to press against said testing member and move the same against said resistance, a gage actuated by said testing member, a measuring member which is mounted to move with said testing member and engages the sample and is moved by the latter relatively to the testing member, and a device which is moved by said measuring member and which is additionally movable relatively thereto to actuate the gage to indicate the depth of the indentation made in the sample by the testing member.

5. In a hardness testing machine, the combination of a movable testing member, means for yieldingly resisting movement thereof, means for causing a sample to press against said testing member to move the same against said resistance, a gage actuated by said testing member, a measuring member which is mounted to move with said testing member and engages the sample and is moved by the latter relatively to the testing member, and a device which is carried by said measuring member and is adapted to be moved relatively thereto for actuating the gage to indicate the depth of the indentation made in the sample by the testing member.

6. In a hardness testing machine, the combination of a movable testing member, a spring for resisting movement thereof, means for causing a sample to press against said testing member and stress said spring, a gage which is actuated by said testing member and indicates the extent of travel thereof, a measuring member which engages the sample and is moved thereby relatively to the testing member, and a device which is moved by said measuring member and which is additionally movable relatively thereto to actuate the gage to indicate the depth of the indentation made in the sample by the testing member.

7. In a hardness testing machine, the combination of a movable testing member, a spring for resisting movement thereof, means for causing a sample to press against said testing member and stress said spring, a gage having an operating member, an adjustable part connected to said testing member and adapted to contact with said gage operating member and actuate the gage to indicate the travel of said testing member, a measuring member which is mounted to move with said testing member and engages the sample and is moved by the latter relatively to the testing member, and a device which is carried by the measuring member and is movable to and from a position in which it contacts with said gage operating member in the zero position of the gage, said device being adapted to be moved relatively to said measuring member for actuating the gage to indicate the depth of the indentation made in the sample by the testing member.

8. In a hardness testing machine, the combination of a movable testing member, a spring for resisting movement thereof, means including a rotatable shaft for causing a sample to press against said testing member and stress said spring, a gage which is actuated by said testing member and indicates the extent of travel thereof, and a graduated indicator which is rotatably adjustable relative to said shaft, and is adapted to be secured to turn with the shaft, a fixed index, said indicator being adapted to be secured to said shaft in a predetermined relation to said fixed index prior to the operation of said shaft when the sample is in contact with said testing member and to indicate by its relation to said index when said testing member is returned to the initial position the depth of the indentation made in the sample by the testing member.

9. In a hardness testing machine, the combination of a movable testing member, means for yieldingly resisting movement thereof, means for causing a sample to press against and move said testing member against said resistance a distance depending upon the extent to which the testing member enters the sample, a gage which is actuated by the testing member, a measuring member which is moved by the sample relatively to the testing member by an amount equal to the distance that the testing member enters the sample, and a device which is operable to actuate the gage to indicate the difference in movement between the testing member and the measuring member after the testing member contacts with the sample.

10. In a hardness testing machine, the combination of a movable testing member, means for yieldingly resisting movement thereof, means for causing a sample to press against said testing member to move the same against said resistance, means for indicating the travel of said testing member, a measuring member which engages the sample and is moved thereby relatively to the testing member, and means for indicating the extent of movement of said measuring member relatively to said testing member.

11. In a hardness testing machine, the combination of a movable testing member, means for yieldingly resisting movement thereof, means for effecting a predetermined initial risistance of said yielding resistance means to said movable testing member, means for causing a sample to press against said testing member and move the same against said resistance, an indicator which is responsive to movement of said testing member and indicates the travel thereof, a measuring member which moves relatively to said testing member when the latter is moved, and a device which is controlled by said measuring member and which is movable to actuate said indicator to indicate the depth of the indentation made in the sample by the testing member.

12. In a hardness testing machine, the combination of a movable testing member, means for yieldingly resisting movement thereof, means for effecting and indicating a predetermined initial resistance of said yielding resistance means, means for causing a sample to press against said testing member and move the same against said resistance, an indicator which is responsive to movement of said testing member and indicates the travel thereof, a measuring member which moves relatively to said testing member when the latter is moved, and a device which is controlled by said measuring member and which is movable to actuate said indicator to indicate the depth of the indentation made in the sample by the testing member.

13. In a hardness testing machine, the combination of a movable testing member, means for yieldingly resisting movement thereof, means for causing contact between said testing member and a sample to be tested and for pressing one against the other, means for indicating the travel of said testing member, a measuring member which engages the sample and is moved thereby relatively to said testing member, and means for indicating the extent of movement of said measuring member relatively to said testing member.

Witness my hand this 22 day of April, 1919.

DONALD C. DAVIS.

Witnesses:
 GEO. E. HAMMOND,
 ALLEN B. BRIMMER.